United States Patent
Khamis et al.

(10) Patent No.: US 12,316,825 B2
(45) Date of Patent: May 27, 2025

(54) ACTIVE STEREO DEPTH PREDICTION BASED ON COARSE MATCHING

(71) Applicant: GOOGLE LLC, Mountain View, CA (US)

(72) Inventors: Sameh Khamis, Mountain View, CA (US); Yinda Zhang, Mountain View, CA (US); Christoph Rhemann, Mountain View, CA (US); Julien Valentin, Mountain View, CA (US); Adarsh Kowdle, San Francisco, CA (US); Vladimir Tankovich, Renton, WA (US); Michael Schoenberg, Mountain View, CA (US); Shahram Izadi, Tiburon, CA (US); Thomas Funkhouser, Mountain View, CA (US); Sean Fanello, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/111,292

(22) Filed: Feb. 17, 2023

(65) Prior Publication Data

US 2023/0209036 A1 Jun. 29, 2023

Related U.S. Application Data

(62) Division of application No. 16/580,802, filed on Sep. 24, 2019, now Pat. No. 11,589,031.

(Continued)

(51) Int. Cl.
*H04N 13/271* (2018.01)
*G06T 7/521* (2017.01)
(Continued)

(52) U.S. Cl.
CPC .......... *H04N 13/271* (2018.05); *G06T 7/521* (2017.01); *G06T 7/90* (2017.01); *H04N 5/33* (2013.01);
(Continued)

(58) Field of Classification Search
CPC ...... H04N 13/271; H04N 13/239; H04N 5/33; G06T 7/521; G06T 7/90; G06T 2207/10024; G06T 2207/10028
(Continued)

(56) References Cited

U.S. PATENT DOCUMENTS 7,260,274 B2 * 8/2007 Sawhney ................ G06T 3/403
382/284
8,842,118 B1 * 9/2014 White ..................... G06T 15/50
345/426

(Continued)

*Primary Examiner* — Christopher S Kelley
*Assistant Examiner* — Asmamaw G Tarko
(74) *Attorney, Agent, or Firm* — Brake Hughes Bellermann LLP

(57) ABSTRACT

An electronic device estimates a depth map of an environment based on matching reduced-resolution stereo depth images captured by depth cameras to generate a coarse disparity (depth) map. The electronic device downsamples depth images captured by the depth cameras and matches sections of the reduced-resolution images to each other to generate a coarse depth map. The electronic device upsamples the coarse depth map to a higher resolution and refines the upsampled depth map to generate a high-resolution depth map to support location-based functionality.

17 Claims, 6 Drawing Sheets

Related U.S. Application Data

(60) Provisional application No. 62/740,072, filed on Oct. 2, 2018, provisional application No. 62/736,628, filed on Sep. 26, 2018.

(51) Int. Cl.
  *G06T 7/90* (2017.01)
  *H04N 5/33* (2023.01)
  *H04N 13/239* (2018.01)

(52) U.S. Cl.
  CPC . *H04N 13/239* (2018.05); *G06T 2207/10024* (2013.01); *G06T 2207/10028* (2013.01)

(58) Field of Classification Search
  USPC .......................................... 348/47
  See application file for complete search history.

(56) References Cited

U.S. PATENT DOCUMENTS

| | | | | |
|---|---|---|---|---|
| 8,842,730 B2* | 9/2014 | Zhou | .................... | H04N 7/0112 375/240.12 |
| 10,032,067 B2* | 7/2018 | El-Khamy | ............ | G06V 40/161 |
| 2006/0013509 A1* | 1/2006 | Kee | ...................... | G06V 40/172 382/312 |
| 2012/0219236 A1* | 8/2012 | Ali | ......................... | G06T 5/002 382/276 |
| 2013/0077852 A1* | 3/2013 | Chang | .................... | G06T 7/593 382/154 |
| 2013/0100256 A1* | 4/2013 | Kirk | ...................... | G06T 7/593 348/48 |
| 2014/0219547 A1* | 8/2014 | Tuzel | .................... | G06T 3/4053 382/154 |
| 2014/0267243 A1* | 9/2014 | Venkataraman | .......... | G06T 1/20 345/419 |
| 2016/0012567 A1* | 1/2016 | Siddiqui | ............. | H04N 13/271 382/154 |
| 2016/0241834 A1* | 8/2016 | Muninder | ........... | H04N 13/144 |
| 2017/0116708 A1* | 4/2017 | Imber | .................. | G06T 15/506 |
| 2017/0116737 A1* | 4/2017 | Imber | ....................... | G06T 7/60 |
| 2017/0116754 A1* | 4/2017 | Imber | ....................... | G06T 5/20 |
| 2017/0116755 A1* | 4/2017 | Imber | ....................... | G06T 7/90 |
| 2017/0116756 A1* | 4/2017 | Imber | .................. | G06T 15/506 |
| 2017/0278289 A1* | 9/2017 | Marino | ................. | G06T 7/536 |
| 2017/0318280 A1* | 11/2017 | Nisenzon | ............ | H04N 13/243 |
| 2018/0189550 A1* | 7/2018 | McCombe | ........... | G06V 40/172 |
| 2018/0352213 A1* | 12/2018 | Valentin | ................. | G06T 7/593 |
| 2018/0357800 A1* | 12/2018 | Oxholm | ................ | G06T 11/001 |

* cited by examiner

ACTIVE STEREO DEPTH PREDICTION BASED ON COARSE MATCHING

CROSS-REFERENCE TO RELATED APPLICATIONS

This application is a divisional application of U.S. patent application Ser. No. 16/580,802, entitled "Active Stereo Depth Prediction Based on Coarse Matching," and filed on Sep. 24, 2019, which claims priority to U.S. Provisional Patent Application No. 62/740,072, entitled "StereoNet: Guided Hierarchical Refinement for Real-Time Edge-Aware Depth Prediction" and filed on Oct. 2, 2018, and to U.S. Provisional Patent Application No. 62/736,628, entitled "ActiveStereoNet: End-to-End Self-Supervised Learning for Active Stereo Systems" and filed on Sep. 26, 2018, the entireties of which is are incorporated by reference herein.

BACKGROUND

Depth cameras are used as inputs for computer vision tasks such as hand, body, or object tracking, three-dimensional (3D) reconstruction, and simultaneous localization and mapping (SLAM). Computation of a depth map relies on stereo triangulation between two images of a scene, which typically suffers in the presence of textureless regions, occlusions, repetitive patterns, thin structures, and reflective surfaces. In addition, computing a depth map typically requires vast amounts of processing power and memory, which often exceeds a computational budge of an electronic device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
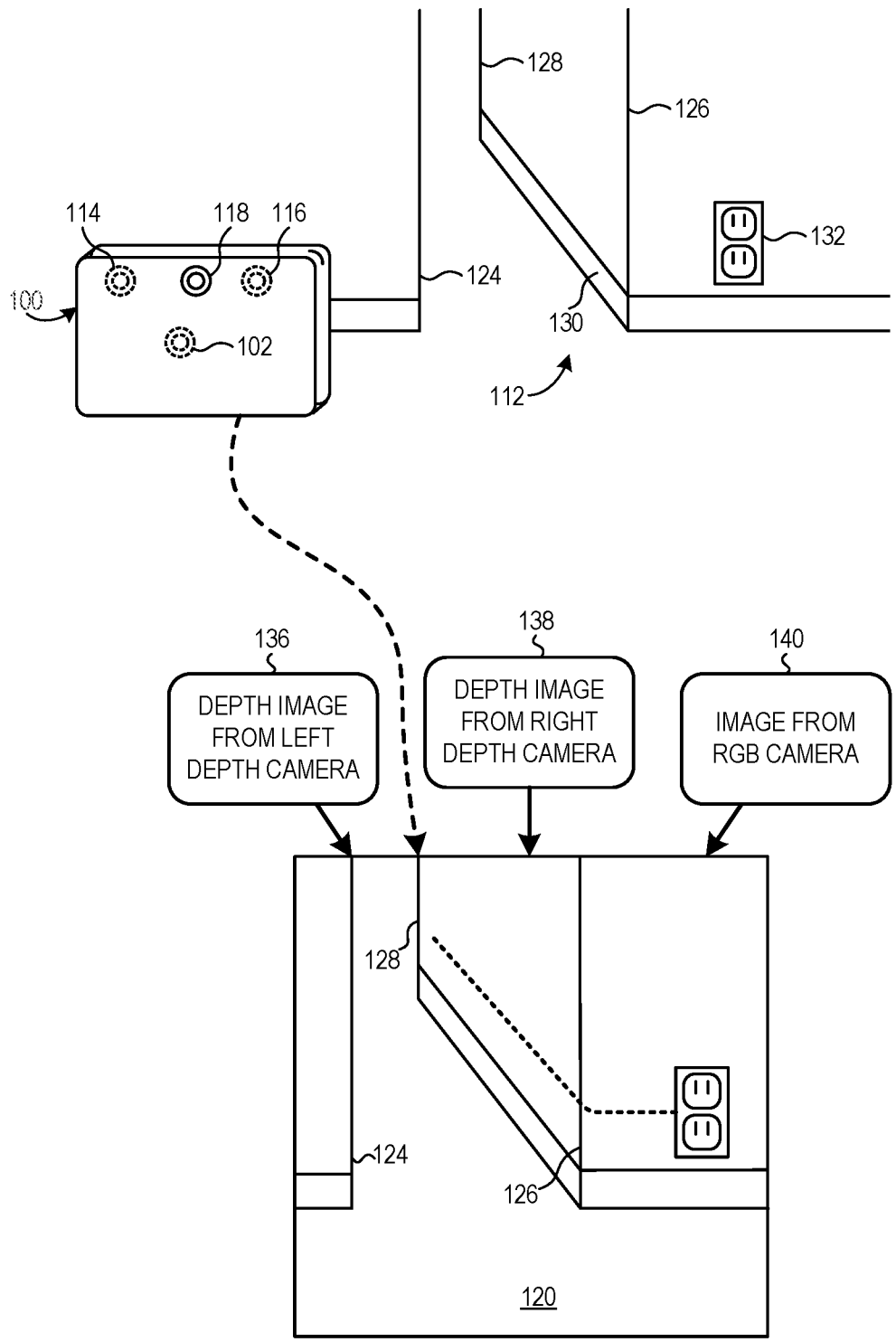
FIG. 1 is a diagram illustrating an electronic device using an active stereo depth camera to estimate a depth map of an environment based on coarse matching in accordance with some embodiments.

The following description is intended to convey a thorough understanding of the present disclosure by providing a number of specific embodiments and details involving estimation of a depth map of an environment based on matching downsampled stereo depth images. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-6 illustrate techniques for estimating a depth map of an environment by an electronic device based on matching downsampled (reduced resolution) stereo depth images captured by depth cameras to generate a coarse disparity (depth) map, upsampling the coarse disparity map to a higher resolution, and refining the upsampled disparity map to generate a high resolution depth map so as to support location-based functionality, such as augmented reality (AR) functionality, virtual reality (VR) functionality, visual localization/odometry or other simultaneous localization and mapping (SLAM) functionality, and the like. In some embodiments, an illuminator such as an infrared (IR) projector projects an illumination pattern into the environment to add texture to a scene. An infrared stereo camera pair including a first camera and a second camera augmented to perceive infrared spectra captures depth images of the environment while the illumination pattern is being projected.

A processor of the electronic device downsamples the images captured by the first and second cameras and matches sections (referred to as patches) of the reduced-resolution images from the first and second cameras to each other to generate a low-resolution disparity (also referred to as a coarse depth map). The processor then upsamples the coarse depth map to generate a full-resolution depth map. To refine the results, the processor determines an error of the full resolution depth map based on matching patches of the full resolution depth map to patches of one of the images captured by the first or second camera based on color.

In some embodiments, prior to matching patches of the reduced-resolution images, the processor normalizes pixel intensities of the reduced-resolution images by removing low frequency components and recalibrating a strength of the illumination pattern to account for fading of the illumination pattern with distance. Normalizing the pixels ameliorates the negative impact of oversaturated pixel intensities on matching, an effect that is exacerbated in an active stereo setting in which an illumination pattern floods the scene, saturating many pixels.

In some embodiments, the processor applies a window-based loss aggregation with adaptive weights for each pixel to increase the discriminability of the pixels and reduce the effect of local minima in a stereo cost function. A single pixel cost has many local minima, each of which may lie far from the actual optimum. By considering a window around each pixel and summing all the costs, the loss becomes smoother for both textured and textureless patches so that the actual optimum is more easily identified. In some embodiments, the processor applies the window-based loss aggregation in a training procedure so that the runtime cost is unaffected.

To handle occluded regions, in some embodiments, the processor computes a disparity from the left viewpoint to use as a hard constraint by defining a mask that ignores pixels with low disparities in the loss computation. The mask avoids oversmooth edges that become flying pixels in the pointcloud due to occluded pixels which do not have any useful information. The processor applies the mask both in the low-resolution disparity and in the final refined disparity.

FIG. 1 illustrates an electronic device 100 configured to support location-based functionality, such as SLAM, VR, or AR, using depth image data in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaming system remote, a television remote, and the like. In other embodiments, the electronic device 100 can include another type of mobile device, such as a head-mounted display, single camera, multi-sensor camera, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a plurality of sensors to obtain information regarding a local environment 112 of the electronic device 100. The electronic device 100 obtains visual information (imagery) for the local environment 112 via depth (infrared) cameras 114 and 116. In some embodiments, the electronic device 100 includes one or more color (RGB) imaging cameras 102. The depth cameras 114 and 116 (also referred to as left depth camera 114 and right depth camera 116), in one embodiment, use a modulated light illuminator 118 to project a modulated light pattern into the local environment 112, and capture reflections of the modulated light pattern as it reflects back from objects in the local environment 112. In some embodiments, the illuminator 118 emits infrared (IR) light. In some embodiments, the depth cameras 114 and 116 are implemented as a pair of monochrome infrared (IR) cameras with a bandpass filter. Although depth cameras 114 and 116 are referred to as left and right cameras in the example embodiment of FIG. 1, it will be appreciated that in other embodiments the cameras may be in different configurations and arrangements. It will further be appreciated that both cameras can capture images of the same environment concurrently.

In some embodiments, the illuminator 118 includes a vertical cavity surface emitting laser (VCSEL). A VCSEL emits light from a larger surface than a laser, and therefore emits more light while still being safe for eyes. In some embodiments, the illuminator 118 is coupled with one or more suitable masks (not shown) to emit structured light (i.e., modulated light patterns). In some embodiments, these modulated light patterns are temporally-modulated light patterns. The captured reflections of the modulated light patterns are referred to herein as "depth images." A processor (not shown) of the electronic device 100 then calculates the depths of the objects, that is, the distances of the objects from the electronic device 100, based on the analysis of the depth imagery.

The electronic device 100 generates depth data based on the detection of spatial features in image data captured by the depth cameras 114 and 116. To illustrate, in the depicted example of FIG. 1 the local environment 112 includes a hallway of an office building that includes three corners 124, 126, and 128, a baseboard 130, and an electrical outlet 132. In this example, the depth cameras 114, 116 capture depth images 136, 138 based on reflections of the first modulated light pattern projected by the illuminator 118 as it reflects back from objects in the local environment 112. In some embodiments, the electronic device trains or calibrates the processor (not shown) based on images 140 of the local environment 112 captured by the RGB camera 102.

The processor (not shown) of the electronic device 100 estimates the depths of objects in the environment 112 via triangulation of corresponding points identified in the depth image 136 from the left depth camera 114 and the depth image 138 from the right depth camera 116. To facilitate subpixel precision within a computational budget, the processor downsamples the depth image 136 captured by the left depth camera 114 to generate a first (left) reduced-resolution image (not shown) and downsamples the depth image 138 captured by the right depth camera 116 to generate a second (right) reduced-resolution image (not shown). The processor matches patches of the left reduced-resolution image to patches of the right reduced-resolution image to generate a coarse depth map of the environment 112. The processor then upsamples the coarse depth map using, e.g., bilinear interpolation, to the original resolution to predict a full-resolution disparity (depth) map. The processor refines the results of the full-resolution disparity map by matching the full-resolution disparity map to one of the depth images 136, 138, based on color, as explained further below.

Figure 2:
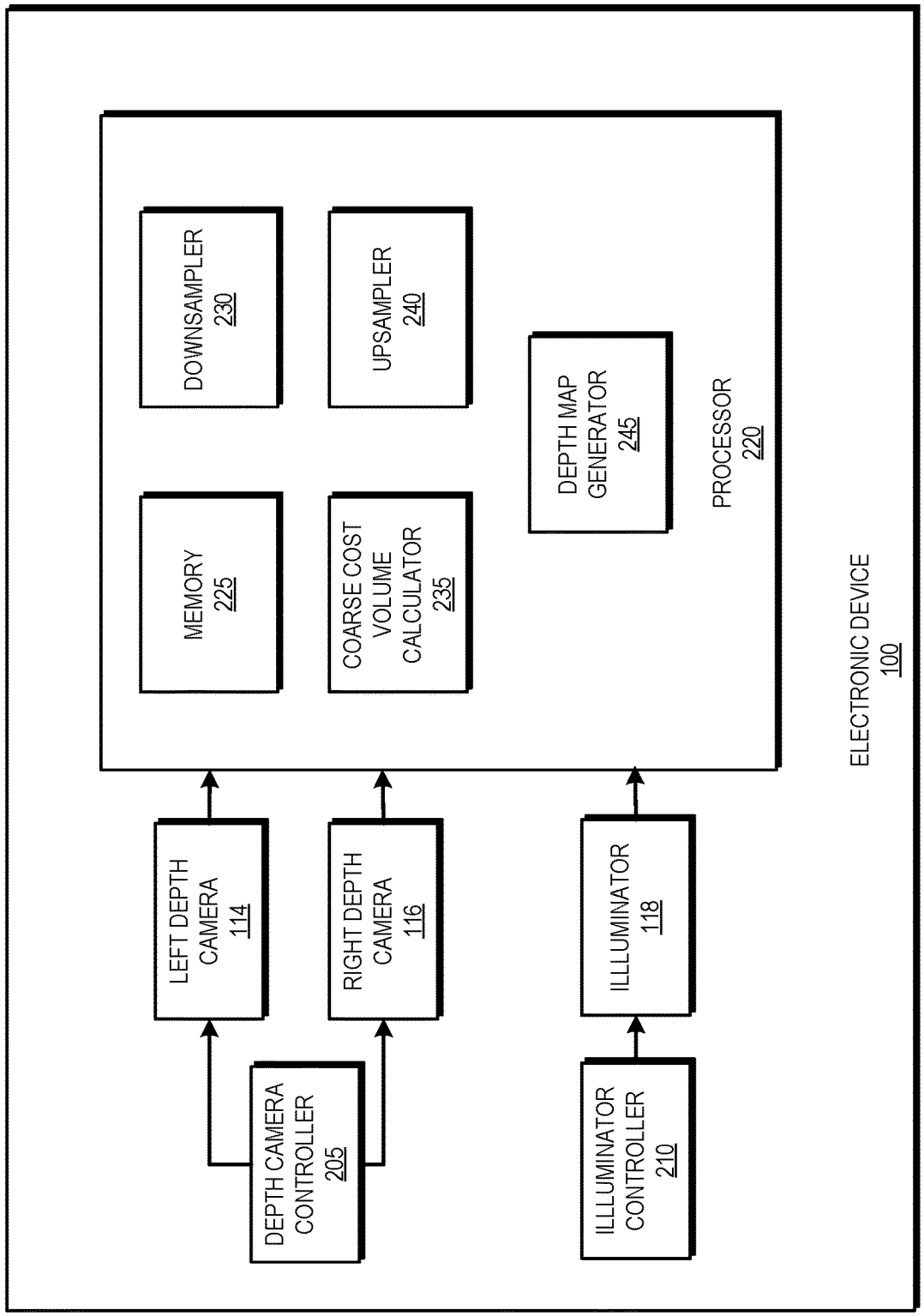
FIG. 2 is a block diagram of the electronic device of FIG. 1 in accordance with some embodiments.

FIG. 2 illustrates the electronic device 100 of FIG. 1 in greater detail in accordance with some embodiments. The electronic device 100 includes a depth camera controller 205 for controlling the left depth camera 114 and the right depth camera 116, an illuminator controller 210 for controlling the illuminator 118, and a processor 220. The processor 220 includes a memory 225, a downsampler 230, a coarse cost volume calculator 235, an upsampler 240, and a depth map generator 245.

The depth camera controller 205 is a module configured to control the activation and exposure times of the left depth camera 114 and the right depth camera 116. The depth camera controller 205 adjusts the frame rate, exposure time, and phase of the left depth camera 114 and the right depth camera 116. In some embodiments, the depth camera controller 205 coordinates the frame rate, exposure time, and phase of the left depth camera 114 and the right depth camera 116 in coordination with the illuminator controller 210. The illuminator controller 210 is a module configured to control the activation and pulse durations of, and illumination patterns projected by, the illuminator 118. The illuminator controller 210 activates the illuminator 118 to pulse an illumination pattern into the environment at a frequency and phase matched to the frequency and phase of one or both of the left depth camera 114 and the right depth camera 116.

The processor 220 is configured to receive depth images (not shown) from the left depth camera 114 (the left image) and the right depth camera 116 (the right image) at the memory 225. In some embodiments, the processor is further configured to receive images from the RGB camera (not shown) at the memory 225. In various embodiments, the memory 225 stores processing logic instructions, constant values, variable values during execution of portions of applications or other processing logic, or other desired information. During execution, applications, operating system functions, processing logic commands, and system software reside in memory 225. In some embodiments, other software commands (e.g., a device driver) also reside in memory 225 during execution of the processor 220. For example, the memory 225 stores a plurality of previously-generated depth images (not shown) that it receives from the left depth camera 114 and the right depth camera 116. In some embodiments, the memory 225 is implemented as a dynamic random access memory (DRAM), and in some embodiments, the memory 225 is implemented using other types of memory including static random access memory (SRAM), non-volatile RAM, and the like.

The downsampler 230 is a module configured to downsample the images received from the left depth camera 114 (referred to as the left depth image(s)) and the right depth camera 116 (referred to as the right depth image(s)) to generate reduced-resolution depth images (not shown). The downsampler 230 may be implemented as hard-coded logic, programmable logic, software executed by the processor 220, or a combination thereof. The downsampler 230 implements a feature network with shared weights between the left depth image and the right depth image (also referred to as a Siamese network). The downsampler 230 downsamples the left depth image and the right depth image. In some embodiments, the downsampler 230 downsamples the left depth image and the right depth image using K 5×5 convolutions with a stride of 2, keeping the number of channels at 32 throughout the downsampling. In some embodiments, the downsampler 230 sets K to 3 or 4. The downsampler 230 then applies 6 residual blocks that employ 3×3 convolutions, batch-normalization, and leaky ReLu activations (x=0.2). The downsampler 230 processes the result using a final layer with a 3× 3 convolution that does not use batch-normalization or activation. The downsampler 230 outputs a 32-dimensional feature vector at each pixel in the downsampled image. The reduced-resolution depth images that the downsampler 230 generates have a large receptive field that is useful for textureless regions and keep the feature vectors compact.

The coarse cost volume calculator 235 is a module configured to compute a matching cost for patches of one or more pixels of the downsampled left and right image frames. The coarse cost volume calculator 235 generates a downsampled disparity map (e.g., a 160×90 disparity map) using a soft argmin operator. The coarse cost volume calculator 235 may be implemented as hard-coded logic, programmable logic, software executed by the processor 220, or a combination thereof. The coarse cost volume calculator 235 forms a cost volume at the reduced resolution of the reduced-resolution depth images by taking the difference between the feature vector (also referred to as an image feature) of a pixel and the feature vectors of matching candidates. In some embodiments, the coarse cost volume calculator 235 learns the right metric by running multiple convolutions followed by non-linearities. To aggregate context across the spatial domain as well as the disparity domain, the coarse cost volume calculator 235 filters the cost volume with four 3D convolutions with a filter size of 3×3×3, batch-normalization, and leaky ReLu activations. The coarse cost volume calculator 235 then applies a final 3×3×3 convolutional layer that does not use batch-normalization or activation, and the filtering layers produce a 1-dimensional output at each pixel and candidate disparity.

For example, for an input reduced-resolution depth image size of W×H and evaluation of a maximum of D candidate disparities, the cost volume size is W/2"×H/2"×(D+1)/2" for K downsampling layers. Because most of the time and compute is spent matching at higher resolutions, while most of the performance gain comes from matching at lower resolutions, the performance loss of matching the reduced-resolution depth maps is insignificant in light of the gain in speed. The coarse cost volume calculator 235 achieves a magnitude higher sub-pixel precision than conventional stereo matching approaches.

In some embodiments, the coarse cost volume calculator 235 selects a disparity which is a softmax-weighted combination of all the disparity values:

$$d_i = \sum_{d=1}^{D} d \cdot \frac{\exp(-C_i(d))}{\sum_{d'} \exp(-C_i(d'))} \quad (1)$$

The coarse cost volume calculator 235 applies a second differentiable variant that is a probabilistic selection that samples from the softmax distribution over the costs:

$$d_i = d, \text{ where } d \sim \frac{\exp(-C_i(d))}{\sum_{d'} \exp(-C_i(d'))} \quad (2)$$

The coarse cost volume calculator 235 differentiates through the sampling process using gradient estimation techniques to learn the distribution of disparities by minimizing the expected loss of the stochastic process. Using the soft arg min selection is faster to converge and easier to optimize than selecting the disparity with the minimum cost at each pixel in the filtered cost volume using a non-differentiable arg min.

The upsampler 240 is a module configured to upsample the downsampled disparity map output from the coarse cost volume calculator 235 to the original resolution. In some embodiments, the upsampler 240 upsamples a 160×90 disparity map using bi-linear interpolation and convolutions to the original resolution of 1280×720. The upsampler 240 may be implemented as hard-coded logic, programmable logic, software executed by the processor 220, or a combination thereof.

The depth map generator 245 is a module configured to hierarchically refine the output of the upsampler 240 with a cascade of the network and apply a single refinement that upsamples the coarse output to the full resolution in one shot. The depth map generator 245 outputs a full-resolution depth map that dilates and erodes around the edges using the color input from one of the left depth image or the right depth image as a guide. The depth map generator 245 may be implemented as hard-coded logic, programmable logic, software executed by the processor 220, or a combination thereof.

In some embodiments, the depth map generator 245 is trained in a fully supervised manner using groundtruth-labeled stereo data, and the depth map generator 245 minimizes the hierarchical loss function:

$$L = \Sigma_k \rho(d_i^k - \hat{d}_i) \quad (3)$$

where $d_i^k$ is the predicted disparity at pixel i at the kth refinement level, with k=0 denoting the output pre-refinement, $\hat{d}_i$ is the groundtruth disparity at the same pixel, and $\rho(.)$ is a two-parameter robust loss function $$\rho(x, \alpha, c) = \frac{|\alpha - 2|}{\alpha} \left( \left( \frac{(x/c)^2}{|\alpha - 2|} + 1 \right)^{\alpha/2} - 1 \right) \quad (4)$$

with its parameters set as x=1 and c=2, approximating a smoothed L1 loss.

Figure 3:
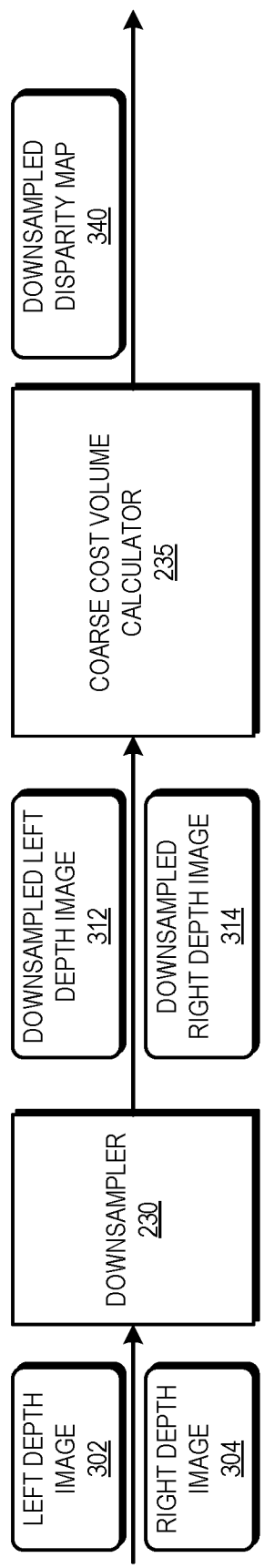
FIG. 3 is a block diagram illustrating the electronic device of FIG. 1 downsampling and comparing images of an environment in accordance with some embodiments.

FIG. 3 illustrates the electronic device 100 downsampling and comparing images of an environment in accordance with some embodiments. The downsampler 230 receives a high-resolution left depth image 302 captured by the left depth camera 114 and a high-resolution right depth image 304 captured by the right depth camera 116 from the memory 225 (not shown). The downsampler 230 produces a downsampled left depth image 312 feature map and a downsampled right depth image 314 feature map at a reduced resolution. For example, in some embodiments, the downsampled left depth image 312 and the downsampled right depth image 314 are ⅛ of the input resolutions of the left depth image 302 and the right depth image 304.

The coarse cost volume calculator 235 receives the downsampled left depth image 312 and the downsampled right depth image 314 from the downsampler 230 and builds a low-resolution cost volume (not shown). In some embodiments, the coarse cost volume calculator 235 builds a low-resolution cost volume of size 160×90×18, allowing for a maximum disparity of 144 in the original image, which corresponds to a minimum distance of ~30 cm on the chosen sensor. The coarse cost volume calculator 235 produces a downsampled 160×90 disparity map 340 using the soft argmin operator. In some embodiments, the coarse cost volume calculator 235 matches the downsampled left depth image 312 to the downsampled right depth image 314 to produce a first downsampled disparity map 340, and matches the downsampled right depth image 314 to the downsampled left depth image 312 to produce a second downsampled disparity map (not shown).

Figure 4:
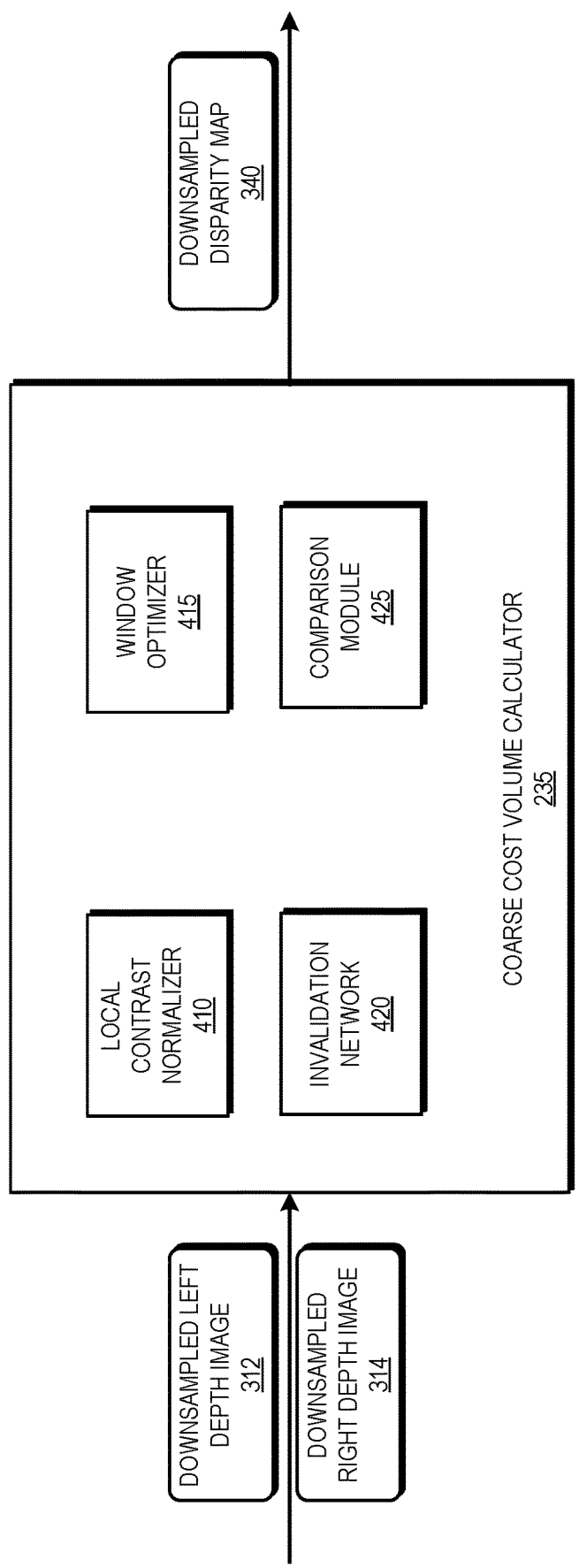
FIG. 4 is a block diagram illustrating the electronic device of FIG. 1 applying local contrast normalization, window-based loss aggregation, and an invalidation mask to downsampled images in accordance with some embodiments.

FIG. 4 illustrates the electronic device 100 applying local contrast normalization, window-based loss aggregation, and an invalidation mask to downsampled images in accordance with some embodiments. In some embodiments, the coarse cost volume calculator 235 includes a local contrast normalizer 410, a window optimizer 415, an invalidation network 420, and a comparison module 425, each of which may be implemented as hard-coded logic, programmable logic, software executed by the processor 220, or a combination thereof.

The local contrast normalizer 410 removes the dependency between intensity and disparity and provides improved residual in occluded regions. The illuminator 118 (not shown) floods the environment 112 of the electronic device 100 with texture, and the intensity of the received signal follows the inverse square law $$I \propto \frac{1}{Z^2},$$

where Z is the distance from the camera. This creates an explicit dependency between the intensity and the distance (i.e., brighter pixels are closer). In addition, the difference between two bright pixels is likely to have a bigger residual when compared to the difference between two dark pixels. Further, when the intensity difference between background and foreground is severe, the loss will have a strong contribution in occluded regions, forcing the network to learn to fit areas that cannot really be explained in the data.

The local contrast normalizer 410 computes, for each pixel, the local mean $\mu$ and standard deviation $\sigma$ in a small (e.g., 9×9) patch. The local contrast normalizer 410 uses these local statistics to normalize the current pixel intensity $$I_{LCN} = \frac{I - \mu}{\sigma + \eta},$$

where $\eta$ is a small constant. The normalized pixel intensity removes the dependency between disparity and brightness, and the reconstruction error is not strongly biased toward high intensity areas or occluded regions.

In low texture regions, the standard deviation $\sigma$ is close to zero which would amplify any residual together with noise between two matched pixels. To remove this effect, the local contrast normalizer 410 re-weights the residual e between two matched pixels $I_{ij}$ and $\hat{I}_{ij}^l$ using the local standard deviation $\sigma_{ij}$ estimated on the reference image in a 9×9 patch around the pixel (i,j). The local contrast normalizer 410 calculates a reconstruction loss $$L = \Sigma_{ij} \|\sigma_{ij}(I_{LCN_{ij}}{}^l - \hat{I}_{LCN_{ij}}{}^l)\|_1 = \Sigma_{ij} C_{ij}. \quad (5)$$

The window optimizer 415 is a module configured to smooth the cost function while preserving edges. For a single pixel cost, the loss function exhibits a highly non-convex behavior with respect to the disparity that makes it more difficult to retrieve the ground truth value due to a single pixel cost having many local minima that could lie far from the actual optimum. The window optimizer 415 considers a window around each pixel in which the contribution of each pixel in the window for matching is based on a distance from the center pixel of the window and a difference in color between each pixel in the window and the center pixel of the window. In some embodiments, the window optimizer 415 integrates an adaptive support scheme in a training procedure that does not affect the runtime cost.

In some embodiments, the window optimizer 415 considers a pixel (i,j) with intensity $I_{ij}$ and instead of computing a per-pixel loss, the window optimizer 415 aggregates the costs $C_{ij}$ around a 2k×2k window following $$\hat{C}_{ij} = \frac{\sum_{x=i-k}^{i+k-1} \sum_{y=j-k}^{j+k-1} \omega_{x,y} C_{ij}}{\sum_{x=i-k}^{i+k-1} \sum_{y=j-k}^{j+k-1} \omega_{x,y}}, \quad (6)$$

where $$\omega_{xy} = \exp\left(-\frac{|I_{ij} - I_{xy}|}{\sigma_\omega}\right) \text{ with } \sigma_\omega = 2.$$

The invalidation network 420 is a module configured to apply an invalidity mask to pixels that are occluded in one or both of the downsampled left depth image 312 and the downsampled right depth image 314. An occluded pixel does not have any useful information in the cost volume even when a brute-force search is performed at different scales. The invalidation network thus identifies matching pixels having a disparity greater than a threshold and ignores the identified pixels when performing a loss computation. To avoid oversmooth edges which become flying pixels (outliers) in the pointcloud, the invalidation network 420 uses a left-right consistency check, in which a disparity is first computed from the left viewpoint ($d_l$), then from the right viewpoint ($d_r$), and invalidates those pixels with $|d_l - d_r| > \theta$, as a hard constraint. The invalidation network 420 defines a mask for a pixel (i,j):

$$m_{ij} = |d_l - d_r| < \theta, \quad (7)$$

with $\theta = 1$ disparity. Those pixels with $m_{ij} = 0$ are ignored in the loss computation. To avoid a trivial solution, for example, one in which all the pixels are invalidated, in some embodiments, the invalidation network 420 enforces a regularization on the number of valid pixels by minimizing the cross-entropy loss with constant label 1 in each pixel location. In some embodiments, the invalidation network 420 applies the invalidation mask in both the low-resolution disparity as well as the final refined (full-resolution) disparity.

In some embodiments, the processor 220 (not shown) trains the invalidation network 420 that takes as input the features computed from the downsampled left depth image 312 and the downsampled right depth image 314 and produces a low resolution invalidation mask (not shown), which is then upsampled by the upsampler 240 and refined with a similar architecture used for the disparity refinement at the depth map generator 245. By applying the invalidation mask, the invalidation network 420 avoids, at runtime, predicting the disparity from both the left and the right viewpoint to perform the left-right consistency check, making the inference significantly faster.

Figure 5:
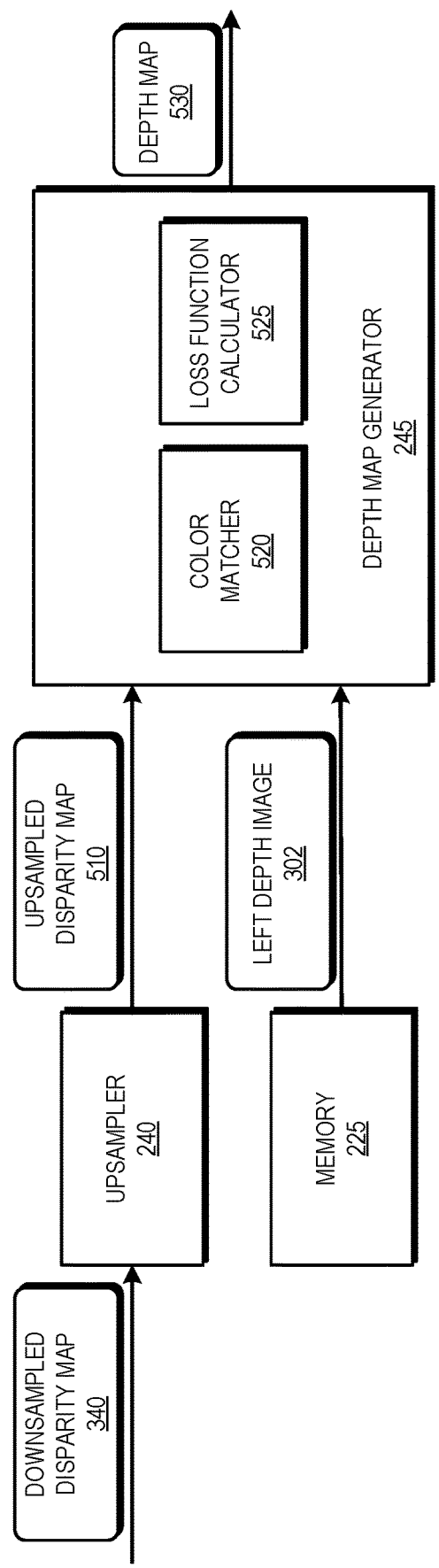
FIG. 5 is a block diagram illustrating the electronic device of FIG. 1 upsampling and refining a downsampled disparity map in accordance with some embodiments.

FIG. 5 illustrates the electronic device 100 upsampling and refining a downsampled disparity map 340 output from the coarse cost volume calculator 235 in accordance with some embodiments. The upsampler 240 receives the downsampled disparity map 340 from the coarse cost volume calculator 235. The upsampler 240 upsamples the downsampled disparity map 340 using, e.g., bi-linear interpolation, to the original resolution of the left depth image 302 and the right depth image 304 to produce an upsampled disparity map 510. The depth map generator 245 receives as inputs the upsampled disparity map 510 as well as the left depth image 302 from the memory 225 and outputs a depth map 530 (also referred to as a left check).

In some embodiments, the upsampler 240 receives a downsampled disparity map based on matching the downsampled right depth image 314 to the downsampled left depth image 312. The upsampler 240 upsamples the downsampled disparity map to the original resolution of the left depth image 302 and the right depth image 304 to produce an upsampled disparity map (not shown). The depth map generator 245 receives as inputs an upsampled disparity map as well as the right depth image 304 from the memory 225 and outputs a depth map (not shown) (also referred to as a right check).

The depth map generator 245 includes a color matcher 520 and a loss function calculator 525. The color matcher 520 and the loss function calculator 525 may be implemented as hard-coded logic, programmable logic, software executed by the processor 220, or a combination thereof. In some embodiments, the color matcher 520 passes the concatenated color of the left depth image 302 and the upsampled disparity map 510 through a 3×3 convolutional layer that outputs a 32-dimensional representation. The color matcher 520 then passes the 32-dimensional representation through 6 residual blocks that employ 3×3 convolutions, batch-normalization, and leaky ReLu activations ($\alpha$=0.2). The color matcher 520 uses atrous convolutions in these blocks to sample from a larger context without increasing the network size. The color matcher 520 sets the dilation factors for the residual blocks to 1, 2, 4, 8, 1, and 1, respectively. The color matcher 520 then processes this output using a 3×3 convolutional layer that does not use batch-normalization or activation. The color matcher 520 outputs a 1-dimensional disparity residual that is added to the previous prediction. The color matcher 520 applies a ReLu to the sum to constrain disparities to be positive.

The loss function calculator 525 is a module configured to refine the full-resolution depth map. The loss function calculator 525 hierarchically refines the output of the color matcher 520 with a cascade of the network by applying the hierarchical loss function of equation (3) above to generate a refined full-resolution depth map 530. In some embodiments, the loss function calculator 525 refines the full-resolution depth map based on a comparison of the left check depth map and the right check depth map.

Figure 6:
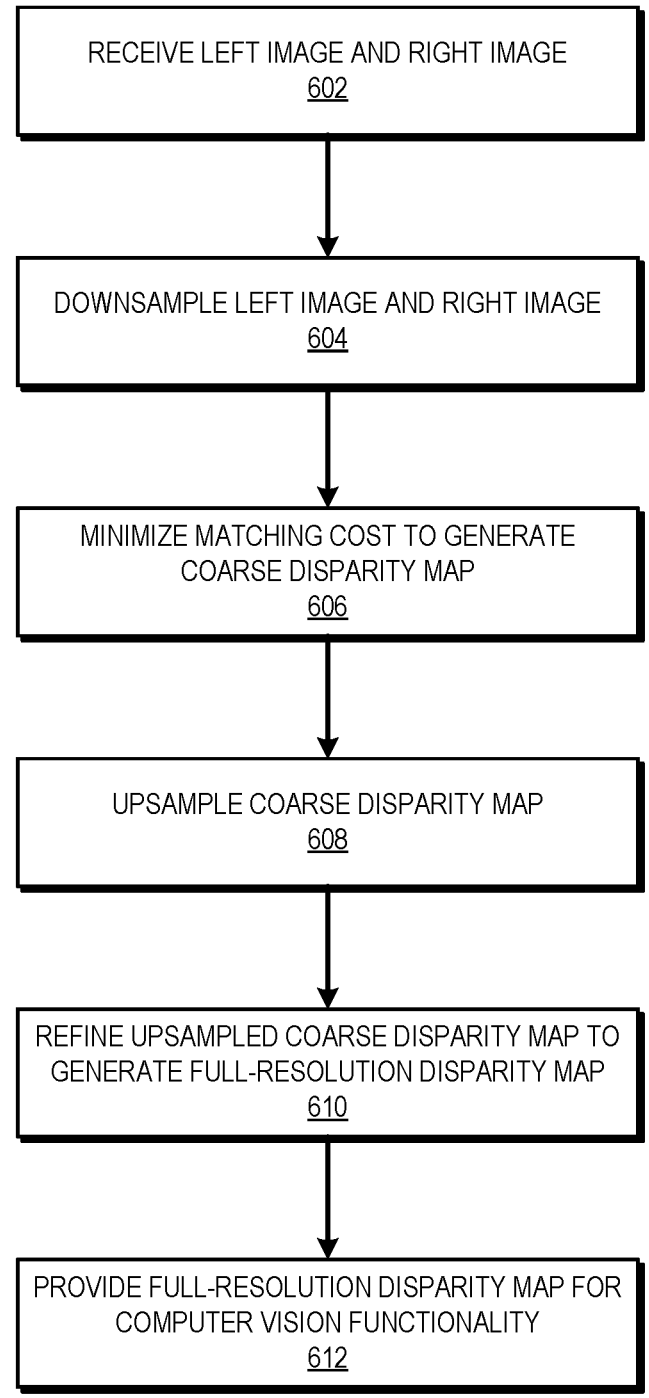
FIG. 6 is a flow diagram illustrating a method of estimating a depth map based on captured depth images in accordance with some embodiments.

FIG. 6 illustrates a method 600 of estimating a depth map based on captured depth images in accordance with some embodiments. The method 600 is implemented in some embodiments of the electronic device 100 shown in FIGS. 1-5. At block 602, the processor 220 receives the left depth image 302 captured by the left depth camera 114 and the right depth image 304 captured by the right depth camera 116. At block 604, the downsampler 230 downsamples the left depth image 302 and the right depth image 304 to generate downsampled (reduced-resolution) depth images 312, 314. At block 606, the coarse cost volume calculator 235 generates a coarse (downsampled) disparity map 340 based on minimizing a matching cost.

In some embodiments, the coarse cost volume calculator 235 normalizes local contrast, applies a window optimizer, and/or applies an invalidation mask to the downsampled depth images 312, 314 before calculating a loss function for the downsampled depth images 312, 314. In embodiments in which the coarse cost volume calculator 235 normalizes local contrast, the local contrast normalizer 410 removes low frequency components from passive IR and re-calibrates the strength of the active pattern locally to account for fading of active stereo patterns projected by the illuminator 118 with distance. In embodiments in which the coarse cost volume calculator 235 applies a window optimizer 415, the window optimizer 415 applies a window-based loss aggregation with adaptive weights for each pixel to increase the pixel's discriminability and reduce the effect of local minima in the stereo cost function. In embodiments in which the coarse cost volume calculator 235 applies an invalidation mask, the invalidation network 420 detects occluded pixels in the downsampled left depth image 312 and the downsampled right depth image 314 and omits the occluded pixels from loss computations. Application of the local contrast normalizer 410, window optimizer 415, and invalidation network 420 improve convergence during training and improve depth accuracy at test time.

At block 608, the upsampler 240 upsamples the coarse disparity map 340 using bilinear interpolation to the original resolution of the left depth image 302 and the right depth image 304. At block 610, the depth map generator 245 refines the upsampled disparity map 510 to generate a full-resolution disparity map by retrieving the high frequency details such as edges. In some embodiments, the depth map generator 245 retrieves the high frequency details by matching the upsampled disparity map 510 to one of the left depth image 302 and the right depth image 304 based on color. In some embodiments, the depth map generator 245 starts with separate convolution layers running on the upsampled disparity map 510 and the left depth image 302 (or right depth image 304), respectively, and merges the features later to produce a residual to facilitate removal of dot artifacts from the depth map 530. At block 612, the depth map generator 245 provides the full-resolution disparity map to the electronic device 100 for computer vision functionality, such as 3D reconstruction, localization and tracking, virtual and augmented reality, and applications such as indoor mapping and architecture, autonomous cars, and human body and face mapping.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    downsampling a first image of a scene illuminated with an illumination pattern captured at a first camera of an infrared stereo camera pair and a second image of the scene captured at a second camera of the infrared stereo camera pair;
    extracting feature vectors from the downsampled first image and the downsampled second image;
    estimating a first coarse disparity map based on matching the feature vectors of the downsampled first image to the feature vectors of the downsampled second image, wherein the estimating comprises identifying matching pixels of the downsampled first image and the downsampled second image having a disparity greater than a threshold;
    upsampling the first coarse disparity map;
    refining the upsampled first coarse disparity map based on matching colors of the upsampled first coarse disparity map to colors of the first image to generate a full resolution depth map, wherein the refining comprises ignoring the identified matching pixels; and
    employing the full resolution depth map to support computer vision functionality.

2. The method of claim 1, wherein estimating the first coarse disparity map comprises:
    normalizing an intensity of each pixel of the downsampled first image and the downsampled second image based on neighboring pixels of each pixel; and
    matching the feature vectors based on the normalized pixel intensities.

3. The method of claim 1, further comprising:
    estimating a second coarse disparity map based on matching the feature vectors of the downsampled second image to the feature vectors of the downsampled first image; and
    upsampling the second coarse disparity map.

4. The method of claim 3, further comprising:
    refining the upsampled second coarse disparity map based on matching colors of the upsampled second coarse disparity map to colors of the second image.

5. The method of claim 1, further comprising adding details from the first image to the upsampled first coarse disparity map.

6. The method of claim 1, wherein extracting feature vectors comprises:
    assigning a value to each patch of the downsampled first image and the downsampled second image based on a contribution of each pixel of the patch, wherein the contribution is based on at least one of a distance of a pixel from a center pixel of the patch and a difference in color between the pixel and the center pixel of the patch; and
    comparing the values of the patches of the downsampled first image to the values of the patches of the downsampled second image.

7. A non-transitory computer readable medium embodying a set of executable instructions, the set of executable instructions to manipulate at least one processor to:
    downsample a first image of a scene illuminated with an illumination pattern captured at a first camera of an infrared stereo camera pair and a second image of the scene captured at a second camera of the infrared stereo camera pair;
    extract feature vectors from the downsampled first image and the downsampled second image;

estimate a first coarse disparity map based on matching the feature vectors of the downsampled first image to the feature vectors of the downsampled second image, wherein the instructions to estimate the first coarse disparity map further comprise instructions to identify matching pixels of the downsampled first image and the downsampled second image having a disparity greater than a threshold;

upsample the first coarse disparity map;

refine the upsampled first coarse disparity map based on matching colors of the upsampled first coarse disparity map to colors of the first image to generate a full resolution depth map, wherein refining the upsampled first coarse disparity map comprises ignoring the identified matching pixels; and employ the full resolution depth map to support computer vision functionality.

8. The non-transitory computer readable medium of claim 7, wherein the instructions to estimate the first coarse disparity map comprise instructions to:

normalize an intensity of each pixel of the downsampled first image and the downsampled second image based on neighboring pixels of each pixel; and match the feature vectors based on the normalized pixel intensities.

9. The non-transitory computer readable medium of claim 7, further comprising instructions to:

estimate a second coarse disparity map based on matching the feature vectors of the downsampled second image to the feature vectors of the downsampled first image; and upsample the second coarse disparity map.

10. The non-transitory computer readable medium of claim 9, further comprising instructions to:

refine the upsampled second coarse disparity map based on matching colors of the upsampled second coarse disparity map to colors of the second image.

11. The non-transitory computer readable medium of claim 7, further comprising instructions to add details from the first image to the upsampled first coarse disparity map.

12. The non-transitory computer readable medium of claim 7, wherein the instructions to extract feature vectors further comprise instructions to:

assign a value to each patch of the downsampled first image and the downsampled second image based on a contribution of each pixel of the patch, wherein the contribution is based on at least one of a distance of a pixel from a center pixel of the patch and a difference in color between the pixel and the center pixel of the patch; and compare the values of the patches of the downsampled first image to the values of the patches of the downsampled second image.

13. A method, comprising:

downsampling a first image of a scene illuminated with an illumination pattern captured at a first camera of an infrared stereo camera pair and a second image of the scene captured at a second camera of the infrared stereo camera pair;

matching patches of the downsampled first image to patches of the downsampled second image to generate a first coarse disparity map, wherein each patch comprises at least one pixel and wherein the generating comprises identifying matching pixels of the downsampled first image and the downsampled second image having a disparity greater than a threshold;

normalizing an intensity of each pixel based on neighboring pixels of each pixel;

upsampling the first coarse disparity map;

refining the upsampled first coarse disparity map based on matching colors of the upsampled first coarse disparity map to colors of the first image to generate a full resolution depth map, wherein the refining comprises ignoring the identified matching pixels; and employing the full resolution depth map to support computer vision functionality.

14. The method of claim 13, further comprising:

estimating a second coarse disparity map based on matching patches of the downsampled first image to patches of the downsampled second image; and upsampling the second coarse disparity map.

15. The method of claim 13, further comprising adding details from the first image to the upsampled first coarse disparity map.

16. The method of claim 13, further comprising refining the full resolution depth map using a convolutional layer.

17. The method of claim 13, further comprising refining the full resolution depth map based on a hierarchical loss function.

* * * * *